United States Patent
Makuta

(10) Patent No.: US 8,029,287 B2
(45) Date of Patent: Oct. 4, 2011

(54) RIDING SIMULATION APPARATUS

(75) Inventor: Yohei Makuta, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 863 days.

(21) Appl. No.: 10/776,522

(22) Filed: Feb. 12, 2004

(65) Prior Publication Data

US 2004/0214639 A1 Oct. 28, 2004

(30) Foreign Application Priority Data

Feb. 14, 2003 (JP) ................................ 2003-037353

(51) Int. Cl.
*G09B 9/04* (2006.01)

(52) U.S. Cl. ................ 434/61; 434/67; 434/69; 463/37; 463/47

(58) Field of Classification Search .................. 463/6, 7, 463/30–33, 37–38, 47; 434/63–71, 61; 446/130, 446/440; 482/57–65
See application file for complete search history.

(56) References Cited

U.S. PATENT DOCUMENTS

| | | | | |
|---|---|---|---|---|
| 3,511,097 A * | 5/1970 | Corwin | ...................... | 73/379.07 |
| 3,964,564 A * | 6/1976 | Pittarelli | ...................... | 180/219 |
| 4,512,567 A * | 4/1985 | Phillips | ...................... | 463/37 |
| 4,637,605 A | 1/1987 | Ritchie | | |
| 5,125,843 A | 6/1992 | Holloway | | |
| 5,209,662 A * | 5/1993 | Fujita et al. | ...................... | 434/61 |
| 5,240,417 A * | 8/1993 | Smithson et al. | ............... | 434/61 |
| 5,364,271 A * | 11/1994 | Aknin et al. | ...................... | 434/61 |
| 5,415,550 A * | 5/1995 | Aoki et al. | ...................... | 434/61 |
| 5,453,066 A * | 9/1995 | Richter, Jr. | ...................... | 482/96 |
| 5,480,366 A * | 1/1996 | Harnden et al. | ............... | 482/61 |
| 5,547,382 A | 8/1996 | Yamasaki et al. | | |
| 6,251,015 B1 * | 6/2001 | Caprai | ............................ | 463/36 |
| 2002/0055422 A1* | 5/2002 | Airmet et al. | ................... | 482/61 |

FOREIGN PATENT DOCUMENTS

| | | |
|---|---|---|
| EP | 1 142 617 A1 | 10/2001 |
| JP | 4-56635 B2 | 9/1992 |
| WO | WO-01/29646 A1 | 4/2001 |

* cited by examiner

*Primary Examiner* — Xuan Thai
*Assistant Examiner* — Bruk Gebremichael
(74) *Attorney, Agent, or Firm* — Birch, Stewart, Kolasch & Birch, LLP

(57) ABSTRACT

A riding simulation system includes a steering handle mechanism capable of being gripped by an operator for steering a front wheel of a motorcycle displayed on a display of a personal computer or the like. The system also includes a frame body for rotatably holding the steering handle mechanism, and a control unit mounted to the frame body for performing control based on the operation amounts of the steering handle mechanism, a clutch lever and a brake lever, with a circuit substrate being incorporated in the control unit and being connected to the detection units through connection cables. The riding simulation system provides a relatively small system with a control unit that is easily mounted to enhance maintenance and installation of system components.

16 Claims, 5 Drawing Sheets

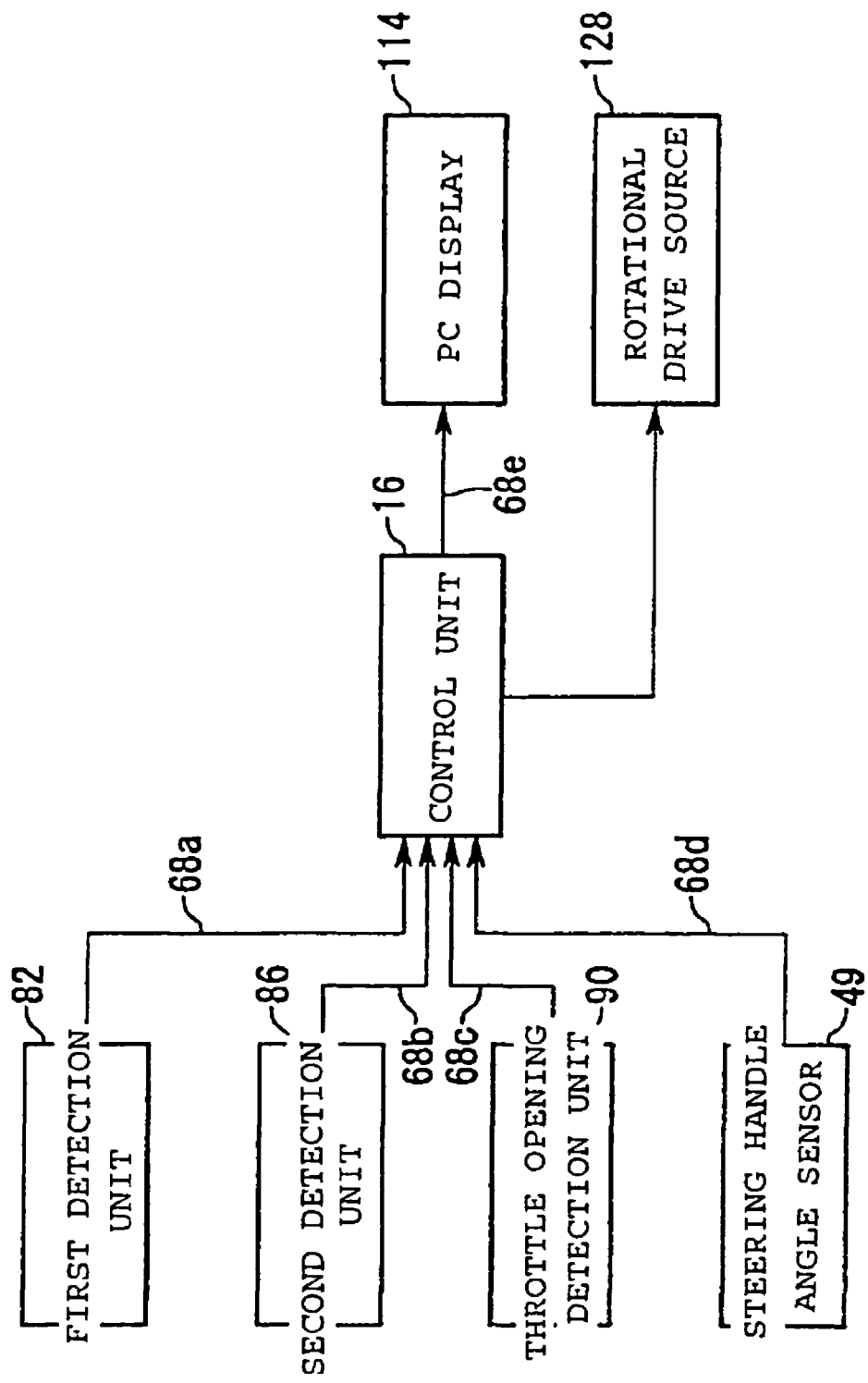

RIDING SIMULATION APPARATUS

CROSS-REFERENCES TO RELATED APPLICATIONS

This nonprovisional application claims priority under 35 U.S.C. §119(a) on Patent Application No. 2003-037353 filed in Japan on Feb. 14, 2003, the entirety of which is herein incorporated by reference.

BACKGROUND OF THE INVENTION

1. Field of the Invention

The present invention relates to a riding simulation system for providing an operator with a pseudo-experience of a running condition of a motorcycle, and more particularly to a riding simulation system displaying scenery seen to the rider as a visual image on a display based on an operating condition of operation designated by the operator.

2. Description of the Background Art

Riding simulation systems for providing an operator with a pseudo-experience of running conditions of a motorcycle by displaying various running conditions on a display in response to various operations performed by the operator have been adopted in the background art for the purpose of entertainment, in the education of the proper operation of a motorcycle, etc.

For example, a riding simulation system for entertainment has a structure in which a steering handle shaft portion extending toward the upper side of a base member having a lower surface formed to be a roughly flat surface shape is provided, and steering handles extending leftwards and rightwards are disposed at a top portion of the steering handle shaft portion. In addition, a box-like instrument panel box having a control panel at its top face is provided at a top portion of the steering handle shaft portion, and steering handles are disposed respectively in leftward and rightward directions from side surfaces of the instrument panel box.

In addition, the steering handles are fitted respectively with a right lever functioning as a brake lever for a front wheel and a left lever for a clutch changeover operation, and an accelerating operation of the motorcycle displayed on the display is effected through a right grip for acceleration which is provided rotatably at a right end portion of the steering handles.

With the riding simulation system mounted on a flat surface such as a floor, the player of the entertainment system grips the steering handles, turns the steering handles around the steering handle shaft portion serving as a center according to the operating condition, turns the right grip as required to effect an accelerating operation of the motorcycle displayed on the display, and/or operates the right lever and the left lever to effect deceleration and perform gear change operations.

In this case, the turning amount of the steering handles, the turning amount of the right grip, the operation amounts of the right lever and the left lever, and the like are outputted as output signals to a circuit substrate provided in the inside of the instrument panel box. The output signals are subjected to data processing in the circuit substrate, and the results of the processing are displayed as the running conditions of the motorcycle on the display. By visually confirming the display, the player gets a pseudo-experience of the operation of the motorcycle.

Japanese Patent Laid-open No. 2002-113264 (paragraphs [0010] to [0023]), the entirety of which is hereby incorporated by reference, provides an exemplary riding simulation system of the background art. In the riding simulation system according to this reference, the circuit substrate for performing the data processing based on the operation amounts of the steering handles, the right grip, the right lever and the left lever and outputting the results of the processing to the exterior is provided in the inside of the instrument panel box.

However, the present inventor has determined that the systems of the background art suffer from the following disadvantages. The instrument panel box may be increased in size with respect to the height direction by an amount corresponding to the incorporation of the circuit substrate therein. As a result, there is a concern that the instrument panel box having an increased size in the height direction would restrict the field of view when the player visually confirms the display which is disposed on the front side of the riding simulation system. In addition, since the circuit substrate is incorporated in the instrument panel box, maintenance thereof is intricate and/or complex to perform.

SUMMARY OF THE INVENTION

The present invention overcomes the shortcomings associated with the background art and achieves other advantages not realized by the background art.

An object of the present invention is to provide a riding simulation system having a relatively small size.

An object of the present invention is to provide a riding simulation system in which it is possible to perform maintenance easily.

One or more of these and other objects are accomplished by a riding simulation system for providing an operator with a pseudo-experience of a running condition of a motorcycle, the system comprising a display for displaying scenery viewable to the operator as a video image on the display, wherein the video image is simulated based on an operating condition designated by the operator through the operation of an operating condition simulating mechanism; a steering handle mechanism capable of being gripped by the operator; a body comprising a pair of frames for rotatably securing the steering handle mechanism; and a control unit for the system being mounted between the pair of frames.

According to the present invention, with the control unit disposed between the pair of frames, the overall size of the riding simulation system in the height direction is prevented from being disadvantageously increased. Therefore, when the operator operates the motorcycle displayed on the display through the riding simulation system, the field of vision of the operator is not restricted when visually confirming the display. With the control unit disposed between the pair of frames, the operation for maintenance of the control unit becomes easy to perform, so that workability can be enhanced.

One or more of these and other objects are accomplished by a riding simulation system for providing an operator with a simulated experience of a running condition of a motorcycle, the system comprising a display for displaying scenery viewable to the operator as a video image on the display, wherein the video image is simulated based on an operating condition designated by the operator through the operation of an operating condition simulating mechanism; a steering handle mechanism capable of being gripped by the operator; a body comprising a pair of frames for rotatably securing the steering handle mechanism; a control unit for the system being mounted between the pair of frames; and an elevated table, wherein the pair of frames are secured to the elevated table.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 5 is a block diagram showing the paths of detection signals detected in the riding simulation system shown in FIG. 1.

DETAILED DESCRIPTION OF THE PREFERRED EMBODIMENTS

Figure 1:
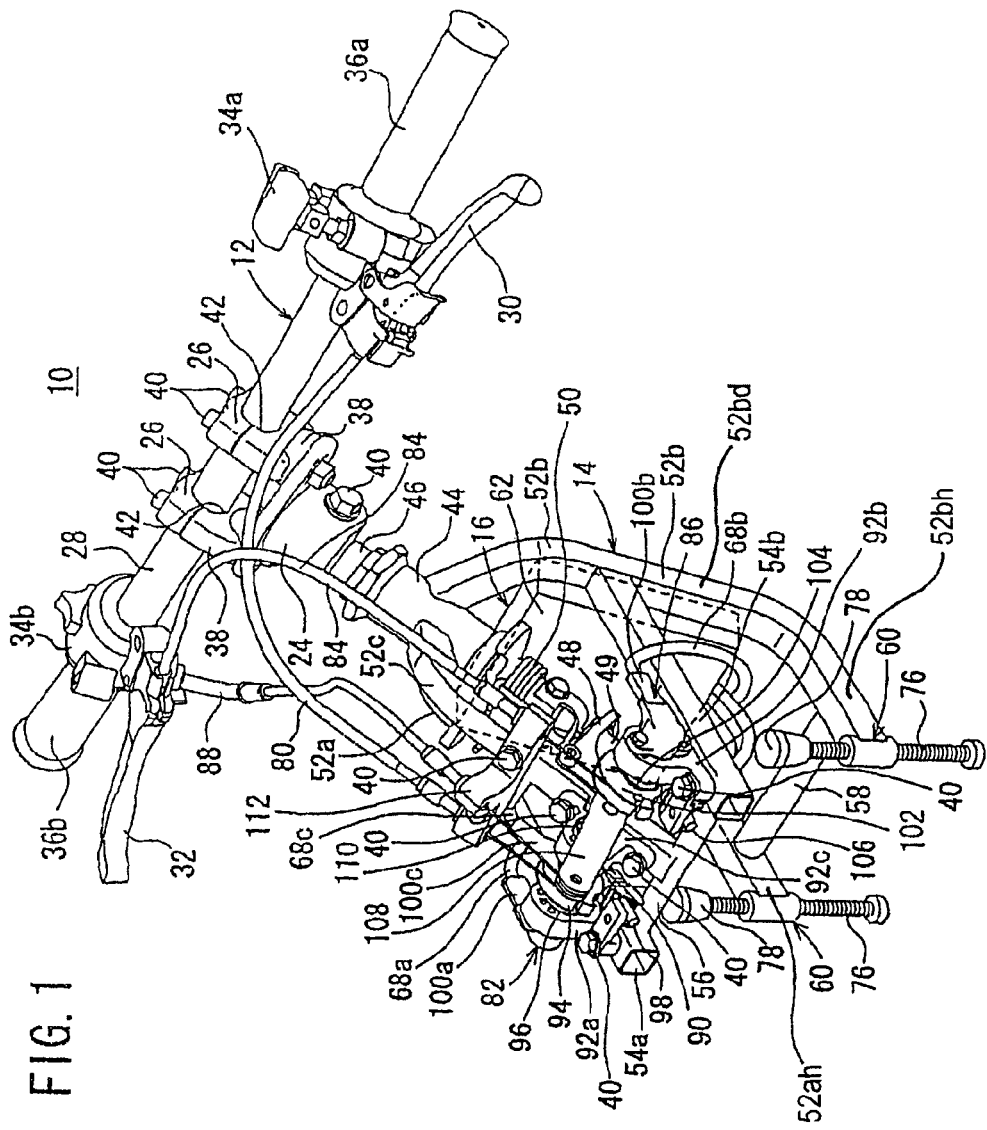
FIG. 1 is a perspective view of a riding simulation system according to an embodiment of the present invention.
Figure 2:
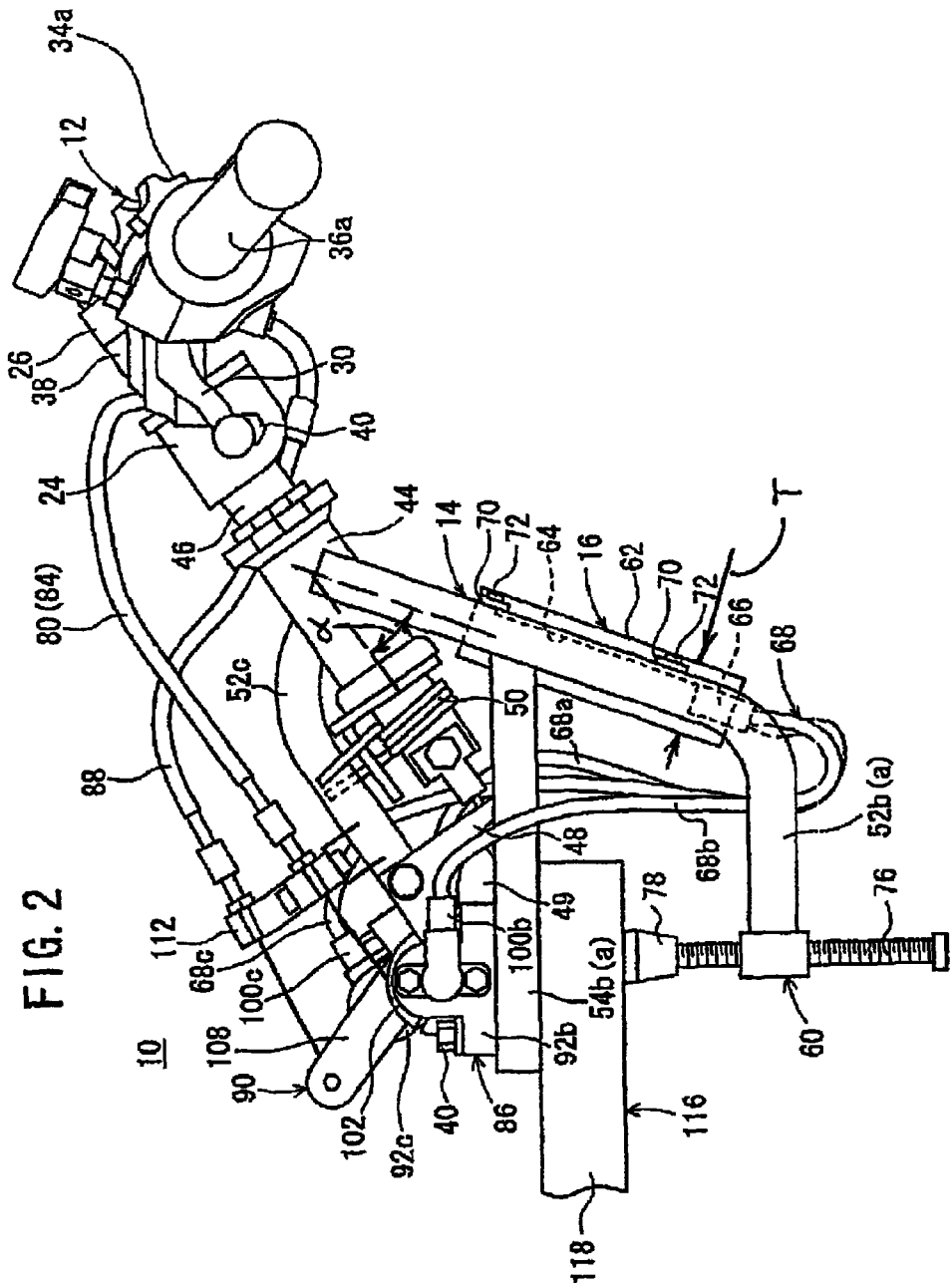
FIG. 2 is a side view of the riding simulation system shown in FIG. 1.
Figure 3:
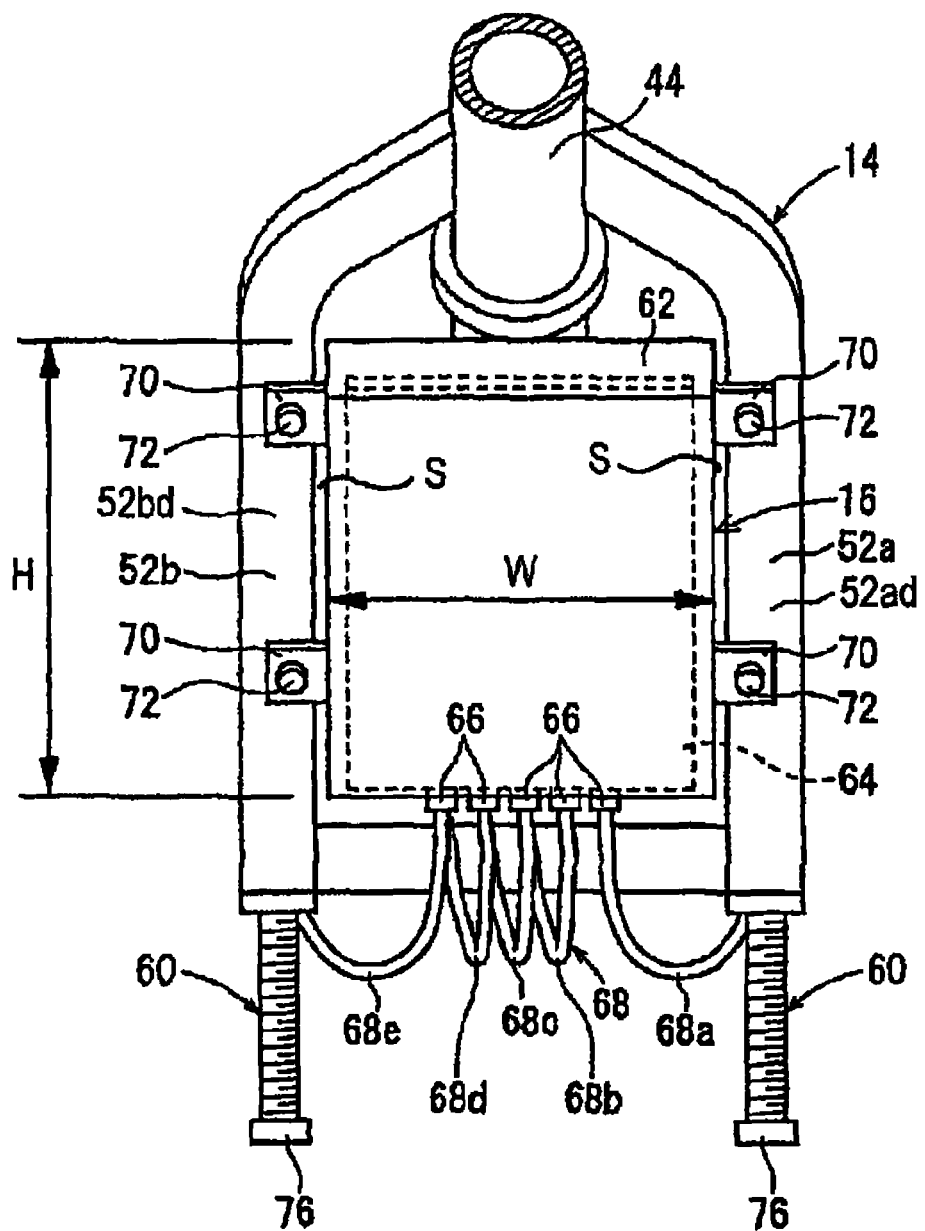
FIG. 3 is a partially omitted, rear elevation of the riding simulation system shown in FIG. 1.
Figure 4:
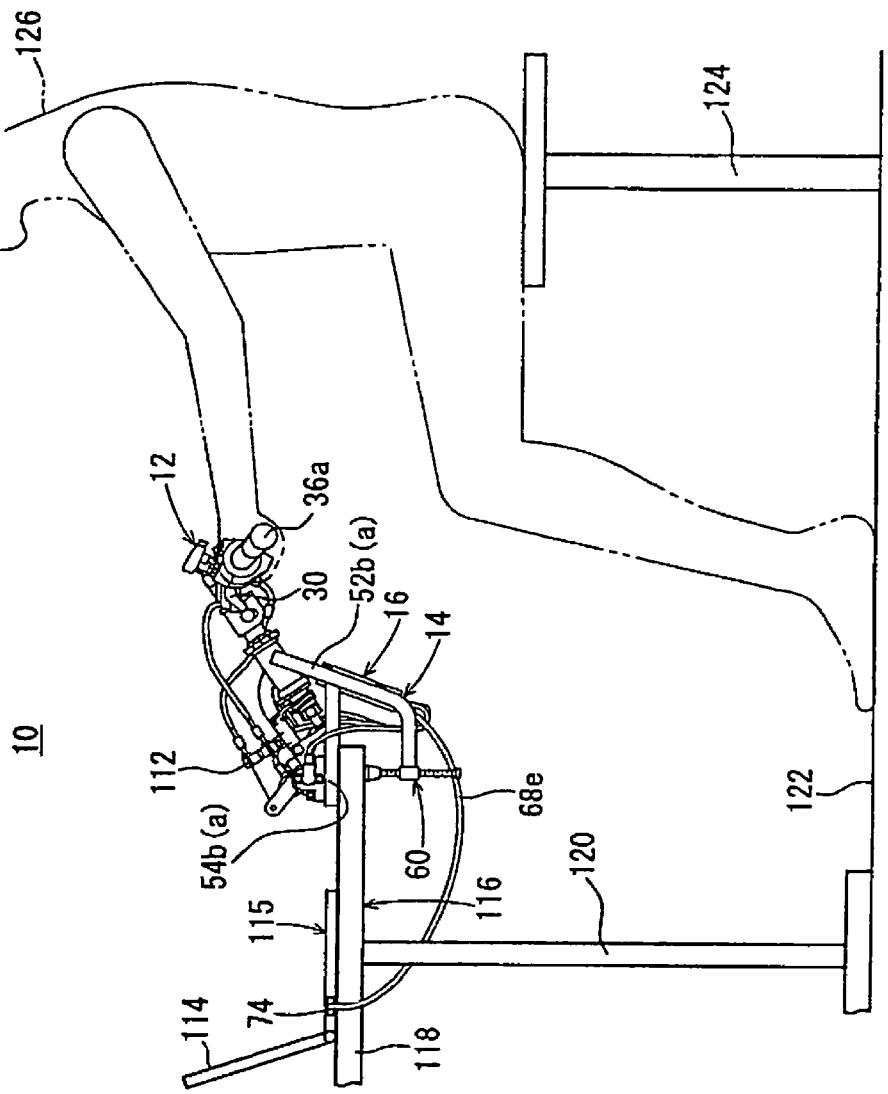
FIG. 4 is a side view showing a situation where the riding simulation system shown in FIG. 1 is secured on a table.

The present invention will hereinafter be described with reference to the accompanying drawings. FIG. 1 is a perspective view of a riding simulation system according to an embodiment of the present invention. FIG. 2 is a side view of the riding simulation system shown in FIG. 1. FIG. 3 is a partially omitted, rear elevation of the riding simulation system shown in FIG. 1. FIG. 4 is a side view showing a situation where the riding simulation system shown in FIG. 1 is secured on a table. FIG. 5 is a block diagram showing the paths of detection signals detected in the riding simulation system shown in FIG. 1.

A preferred embodiment of the riding simulation system 10 according to the present invention will be provided in greater detail hereinafter referring to the accompanying drawings. In FIGS. 1 and 2, reference symbol 10 denotes the riding simulation system 10 according to a preferred embodiment of the present invention. The riding simulation system 10 (hereinafter referred to simply as the simulation system 10) is comprised of a steering handle mechanism 12 capable of being gripped by the operator 126 (see FIG. 4) for steering a front wheel of a motorcycle displayed on a display 114 of a personal computer 115 or the like (see FIG. 4) which will be described later, a frame body (body) 14 for turnably holding the steering handle mechanism 12, and a control unit 16 mounted to the frame body 14 for performing control based on the operation amounts of the steering handle mechanism 12, a clutch lever 30 and a brake lever 32. Incidentally, the steering handle mechanism 12 and the frame body 14 function as a dummy or simulating operating condition mechanism.

The steering handle mechanism 12 is comprised of a steering stem 24 having an upper portion formed in a roughly fan-like shape, an elongate steering handle 28 integrally held on the steering stem 24 through a holder 26, lever joint portions 34a, 34b through which a clutch lever 30 and a brake lever 32 are held on the steering handle 28, and left and right grips 36a and 36b covered with rubber or the like which are mounted respectively to end portions of the steering handle 28.

The steering stem 24 is provided at its upper end portion with a generally fan-shaped mount surface to which a pair of mount flanges 38 are connected roughly in parallel through bolts 40 in such a manner as to project upwards. The mount flanges 38 are each provided with a semi-circular recessed portion 42 corresponding to the outside diameter of the steering handle 28.

In addition, a lower end portion of the steering stem 24 is integrally connected, through a bolt 40, to an upper end portion of a stem member 46 inserted in a cylindrical portion 44 of the frame body 14. The upper end portion of the stem member 46 is thus connected with the steering stem 24, whereas a lower end portion of the stem member 46 inserted in the cylindrical portion 44 of the frame body 14 is inserted in a hole portion (not shown) formed in a roughly central portion of a bracket 48 connected to the frame body 14.

In addition, the bracket 48 is provided with a steering handle angle sensor 49 for detecting the turning amount of the tip end portion of the stem member 46 passing through the hole portion. Furthermore, a spring 50 is provided between the stem member 46 and the bracket 48 to ensure that the steering handle 28 connected to the stem member 46 is constantly located in a center position.

The steering handle 28 is formed in a cylindrical shape from a pipe material or the like, and a left grip 36a is attached to a left end portion of the steering handle 28. In addition, a right grip 36b is similarly attached to a right end portion of the steering handle 28. The right grip 36b, by being turned toward the viewer's side by the operator 126 (see FIG. 4), functions as a throttle grip for an accelerating operation of the motorcycle displayed on the display 114 (see FIG. 4) of a personal computer 115 or the like.

Central portions of the steering handle 28 are mounted in the recessed portions 42 (see FIG. 1) of the mount flanges 38. With the pair of holders 26 mounted from upper portions of the mount flanges 38 and fastened with the bolts 40, the steering handle 28 is clamped between the mount flanges 38 and the holders 26 and is integrally fixed to the steering stem 24. The lever joint portion 34a is disposed on the left side of the steering handle 28. The lever joint portion 34a is integrally fitted with the clutch lever 30 on the front side of the simulation system 10.

The clutch lever 30 is shaft-supported so as to be rotatable relative to the lever joint portion 34a. With the clutch lever 30 gripped and turned toward the steering handle 28 when a gear changing operation for gears is performed by the operator 126 (see FIG. 4), a clutch in the motorcycle displayed on the display 114 (see FIG. 4) is disconnected, resulting in the condition where a gear changing operation can be performed. However, the clutch lever 30 is disposed only in the case of a motorcycle provided with a manual transmission. In the case of a motorcycle provided with an automatic transmission, a brake lever is disposed in place of the clutch lever 30.

In addition, a lever joint portion 34b is disposed on the right side of the steering handle 28. The lever joint portion 34b is integrally fitted with a brake lever 32 on the front side of the simulation system 10. The brake lever 32 is shaft-supported so as to be rotatable relative to the lever joint portion 34b. With the brake lever 32 gripped and turned toward the steering handle 28 by the operator 126, the front wheel of the motorcycle displayed on the display 114 of the personal computer 115 is set into a braked condition.

The frame body 14 is comprised of three frames, e.g., first to third main frames 52a, 52b, and 52c, connected at equal angular intervals from the cylindrical portion 44 in which the stem member 46 is inserted, a pair of sub-frames 54a and 54b connected to roughly central portions of the first and second main frames (frames) 52a and 52b so as to extend toward the front side of the simulation system 10, a cross frame 56 for connection between tip end portions of the sub-frames 54a and 54b, and a connection frame 58 for connection between the first and second main frames 52a and 52b. The connection frame 58 is provided on the lower side of and substantially in parallel to the cross frame 56.

The first to third main frames 52a to 52c are disposed at equal angular intervals, with the cylindrical portion 44 as a center. The first and second main frames 52a and 52b are disposed so as to be substantially symmetric in the leftward and rightward directions from the cylindrical portion 44, and extend from the cylindrical portion 44 toward the front side of the simulation system 44 while being inclined at a predetermined angle (see FIG. 2).

In addition, the first and second main frames 52a and 52b have downwardly sloping linear portions 52ad, 52bd, and tip end portions (horizontal linear portions) 52ah, 52bh extending substantially horizontal on the lower side thereof, and a stopper mechanism 60 for fixing the frame body 14 to a flat-surfaced table 116 or the like is provided at the tip end portions. A control unit 16 is disposed between the first and second main frames 52a and 52b (see FIGS. 1 and 3). Control unit 16 is mounted in a position between linear portions of said pair of the first and second main frames 52a, 52b and under the centrally located main frame 52c, the position of the control unit 16 being such that a major portion of the control unit 16 extends below where the pair of sub-frames 54b are connected to the first and second main frames 52a, 52b.

The control unit 16 includes a casing 62 formed in a substantially box-like shape. The casing 62 is formed with a width W in a lateral direction of the body 14; a height H parallel to the linear portions of the first and second main frames 52a, 52b; and a thickness T which is orthogonal to the width W and the height H. The height H and the thickness T have the relationship H>T. A circuit substrate 64 is disposed in the inside of the casing 62, and a plurality of connection cables 68 are connected to the circuit substrate 64 through connectors 66. The casing 62 is disposed between the first main frame 52a and the second main frame 52b, is provided with a plurality of flange portions 70 projecting to the side of the first main frame 52a, and is provided similarly with a plurality of flange portions 70 projecting to the side of the second main frame 52b. The flange portions 70 are spaced from each other by a predetermined interval. Further, a space is provided between left and right sides of the casing 62 and the corresponding linear portion of the left and right main frames 52a, 52b. When the body 14 is viewed in side view the linear portion of the first and second main frames 52a, 52b can be seen to be oriented at an acute angle α with respect to the steering stem 46.

In addition, the flange portions 70 are each provided with a hole portion (not shown) in a substantially central portion thereof. Attaching bolts 72 are passed through the hole portions and screw-engaged into screw holes (not shown) formed in the first and second main frames 52a and 52b, whereby the casing 62 is integrally fixed to the first and second main frames 52a and 52b.

Further, the sheet-like circuit substrate 64 is disposed in the inside of the casing 62 through fixing devices or fasteners (not shown). A plurality of the connectors 66 are disposed at a lower end portion of the circuit substrate 64, and a plurality of the connection cables 68 are connected to the circuit substrate 64 through the connectors 66.

The connection cables 68 include a first connection cable 68a connected to a connector 100a of a first detection unit 82 which will be described later, a second connection cable 68b connected to a connector 100b of a second connection unit 86 which will be described later, a third connection cable 68c connected to a connector 100c of a throttle opening detection unit 90 which will be described later, a fourth connection cable 68d connected to a connector (not shown) of the steering handle angle sensor 49, and a fifth connection cable 68e connected to a connection terminal 74 (see FIG. 4) of the personal computer 115 or the like mounted on the table 116.

The stopper mechanism 60 includes a pair of fixing bolts 76 which are disposed substantially orthogonally to the first and second main frames 52a and 52b and which are screw-engaged respectively with tip end portions of the first and second main frames 52a and 52b, and holding portions 78 provided at upper end portions of the fixing bolts 76 in the form of being enlarged radially outwards. Incidentally, the top faces of the holding portions 78 are formed to be substantially flat surfaces.

In addition, by turning the fixing bolts 76 screw-engaged with the first and second main frames 52a and 52b, the fixing bolts 76 are vertically displaced along the axial direction thereof. The third main frame 52c disposed between the two first and second main frames 52a and 52b at the cylindrical portion 44 is curved downwards from the cylindrical portion 44, and is connected to the cross frame 56.

On the top face of the sub-frame 54a on one side, there is disposed the first detection unit 82 which is operated in conjunction with the clutch lever 30 through a clutch wire 80 so as to detect the operation amount of the clutch lever 30. On the top face of the sub-frame 54b on the other side, there is disposed the second detection unit 86 which is operated in conjunction with the brake lever 32 through a brake wire 84 so as to detect the operation amount of the brake lever 32.

In addition, a throttle opening detection unit 90 for detecting the opening (turning amount) of the right grip 36b mounted to the steering handle 28 through a throttle wire 88 is disposed at the top face of the third main frame 52c connected to the cross frame 56. As shown in FIG. 1, the first detection unit 82 includes a detection unit main body 92a fixed to the sub-frame 54a through bolts 40, a first rotative pulley 94 shaft-supported turnably relative to the detection unit main body 92a, a first return spring 96 interposed between the detection unit main body 92a and the first rotative pulley 94, and a first stopper portion 98 for restricting the turning motion of the first rotative pulley 94.

The other end portion side of the clutch wire 80 having one end portion connected to the clutch lever 30 is connected to the first pulley 94. The first return spring 96, by its spring force, applies a biasing force in the direction of pulling the clutch wire 80 connected to the first pulley 94. A sensor (not shown) for detecting the rotation amount of the first pulley 94 is incorporated in the detection unit main body 92a. The turning amount of the first rotation pulley 94 detected by the sensor is outputted as a detection signal to the control unit 16 through the first connection cable 68a connected to the connector 100a of the detection unit main body 92a.

Like the first detection unit 82, the second detection unit 86 is comprised of a detection unit main body 92b fixed to the sub-frame 54b through bolts 40, a second rotative pulley 102 shaft-supported turnably relative to the detection unit main body 92b, a second return spring 104 interposed between the detection unit main body 92b and the second rotative pulley 102, and a second stopper portion 106 for restricting the turning motion of the second rotative pulley 102.

The other end portion side of a brake wire 84 having one end portion connected to the brake lever 32 is connected to the second pulley 102. The second return spring 104, by its spring force, applies a biasing force in the direction of pulling the brake wire 84 connected to the second pulley 102. A sensor (not shown) for detecting the turning amount of the second pulley 102 is incorporated in the detection unit main body 92b. The turning amount of the second pulley 102 detected by the sensor is outputted as a detection signal to the control unit 16 through a second connection cable 68b connected to the connector 100b of the detection unit main body 92b.

The throttle opening detection unit 90 has a structure in which one end portion side of a turning plate 108 is rotatably, shaft-supported through a detection unit main body 92c fixed to the third main frame 52c with bolts 40. A spring 110 for urging the turning plate 108 in the direction of spacing away from the cylindrical portion 44 is interposed between the turning plate 108 and the detection unit main body 92c. In addition, the other end portion side of a throttle wire 88 having one end portion connected to the right grip 36b is connected to the other end portion side of the turning plate 108. A sensor (not shown) for detecting the turning amount of the turning plate 108 is incorporated in the detection unit main body 92c.

The turning amount of the turning plate 108 detected by the sensor is outputted as a detection signal to the control unit 16 through the third connection cable 68c connected to the connector 100c of the detection unit main body 92c. Furthermore, a cable stopper 112 for holding the clutch wire 80, the brake wire 84 and the throttle wire 88 is mounted on the top face of the third main frame 52c, at a position spaced by a predetermined interval from the throttle opening detection unit 90, through a bolt 40. The cable stopper 112 is formed in a roughly T shape in section. The throttle wire 88 is passed through and held in a groove portion formed in a substantially central portion of the cable stopper 112, and the clutch wire 88 connected to the clutch lever 30 is passed through and held in a groove portion formed on the right side of the cable stopper 112. In addition, the brake wire 84 connected to the brake lever 32 is passed through and held in a groove portion formed on the left side of the cable stopper 112.

The operations and functions or effects of the aforementioned riding simulation system 10 will be described in greater detail hereinafter. A method for mounting the simulation system 10 to the table 116 or the like will first be described. As shown in FIG. 4, the simulation system 10 is mounted so that the lower surfaces of the pair of sub-frames 54a and 54b of the frame body 14 make contact with the top face of a flat plate portion 118 of the flat-surfaced table 116 on which the personal computer 115 or the like is mounted, for example.

Then, the fixing bolts 76 of the stopper mechanism 60 are displaced upwards by turning them, whereby the top faces of the holding portions 78 provided at upper portions of the fixing bolts 76 are brought into contact with the lower surface of the flat plate portion 118.

As a result, the table 116 is clamped by the sub-frames 54a and 54b and the holding portions 78 of the stopper mechanism 60. In other words, the simulation system 10 is easily fixed to the table 116 by the sub-frames 54a and 54b and the stopper mechanism 60. Incidentally, the table 116 is installed on a floor surface 122 or the like by a leg portion 120 which is connected substantially perpendicularly to and extending downwards from the flat plate portion 118.

The fifth connection cable 68e connected to the control unit 16 of the simulation system 10 is connected to the connection terminal 74 (see FIG. 4) of the personal computer (PC) 115 mounted on the table 116.

Next, a method of operating the simulation system 10 mounted onto the table 116 or the like will be described. First, as shown in FIG. 4, the operator 126 is seated on a chair 124 disposed on the rear side of the simulation system 10, grips the right grip 36b of the steering handle 28 by his right hand, and grips the left grip 36a (see FIG. 1) of the steering handle 28 by his left hand.

After the preparatory stage as above, the steering handle mechanism 12, the right grip 36b, the brake lever 32 and the clutch lever 30 are operated by the operator 126 (see FIG. 4), as shown in FIG. 1, whereupon the turning amount of the steering handle mechanism 12, the throttle opening determined through the right grip 36b and the operation amounts of the brake lever 32 and the clutch lever 30 are detected by the steering handle angle sensor 49, the throttle opening detection unit 90, the first detection unit 82 and the second detection unit 86.

Then, as shown in FIG. 5, the detection signals thus detected are outputted to the control unit 16 on the circuit substrate 64 through the first to fourth connection cables 68a to 68d connected to the respective connectors 100a to 100c of the first and second detection units 82 and 86, the throttle opening detection unit 90 and the steering handle angle sensor 49.

Then, based on these detection signals, data processing, e.g., calculation of acceleration or deceleration, etc. is performed in the circuit substrate 64 incorporated in the control unit 16, and processed signals obtained upon the data processing are outputted to the personal computer 115 mounted on the table 116 through the fifth connection cable 68e connected to the circuit substrate 64. Then, the running condition of the motorcycle in the simulation system 10 based on the processed signals is displayed on the display 114 of the personal computer 115 mounted on the table 116. As shown in FIG. 5, a rotational drive source 128 may be driven through an output signal from the control unit 16, thereby moving the steering handle mechanism 12.

Thus, in this embodiment, the control unit 16 with the circuit substrate 64 incorporated therein is disposed between the first and second main frames 52a and 52b, whereby the control unit 16 can be favorably contained between the first and second main frames 52a and 52b, so that the overall size of the simulation system 10 in the height direction is prevented from being increased.

Therefore, when the operator 126 operates the motorcycle displayed on the display 114 of the personal computer 115 mounted on the table 116, the field of vision of the operator 126 is prevented from being restricted, since the height of the simulation system 10 is relatively reduced.

In addition, since the control unit 16 is disposed between the first and second main frames 52a and 52b, maintenance can be carried out easily, and workability can be enhanced. Furthermore, at the time of conveying the simulation system 10, the simulation system 10 can be conveyed favorably by gripping the casing 62 of the control unit 16 disposed between the first and second main frames 52a and 52b.

According to the present invention, the following effects are obtained. Namely, according to the riding simulation system of the present invention, the control unit is disposed between the pair of frames, whereby the overall size of the riding simulation system in the height direction is prevented from being increased. Therefore, when the operator operates the motorcycle displayed on the display, the operator's field of vision in visually confirming the display is prevented from being restricted. In addition, with the control unit disposed between the pair of frames, the procedures for maintenance of the control unit are relatively easy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A riding simulation system for providing an operator with a simulated experience of a running condition of a motorcycle, said system comprising:
   a display for displaying scenery viewable to the operator as a video image on the display, wherein said video image is simulated based on an operating condition designated by the operator through the operation of an operating condition simulating mechanism;
   a steering handle mechanism capable of being gripped by the operator;
   a body for rotatably securing said steering handle mechanism, the body comprising
      a pair of left and right main frames,
      a centrally located main frame, and a pair of sub-frames connected to roughly central portions of the left and right main frames so as to extend from the left and right main frames in a direction away from the operator of the simulation system; and
   a control unit for said system being mounted in a position between downwardly sloping linear portions of said pair of left and right main frames and under the centrally located main frame,
   lateral sides of the control unit having lengths which are parallel to the downwardly sloping linear portions,
   the position of the control unit being such that most of the control unit extends below where the sub-frames are connected to the downwardly sloping linear portions of left and right main frames, the position of the control unit being rearward with respect to each of the sub-frames,
   wherein each of the left and right main frames includes a horizontal linear portion extending from a lower end of the corresponding downwardly sloping linear portion in the direction away from the operator of the simulation system direction and parallel to the corresponding sub-frame,
   wherein said riding simulation apparatus is adapted to be mounted on a standard household table, and
   since the control unit is mounted such that the lengths of the lateral sides of the control unit are parallel to the downwardly sloping linear portions, the control unit is mounted completely away from an upper side of the standard household table.

2. The riding simulation system according to claim 1, wherein said steering handle mechanism further comprising:
   a steering stem having a generally fan-shaped upper portion,
   an elongate steering handle that is integrally held on the steering stem through a holder, the steering handle mechanism further comprising:
   lever joint portions through which at least one of a clutch lever and a brake lever are held on the steering handle, and
   left and right grips which are mounted respectively to end portions of the steering handle.

3. The riding simulation system according to claim 1, further comprising a clutch lever and a brake lever.

4. The riding simulation system according to claim 1, further comprising a steering handle angle sensor for detecting a turning amount of a tip end portion of the stem member.

5. The riding simulation system according to claim 1, wherein the steering handle mechanism is formed in a cylindrical shape and includes a throttle grip for an accelerating operation of the motorcycle displayed on the display.

6. The riding simulation system according to claim 2, wherein the steering handle mechanism is formed in a cylindrical shape and includes a throttle grip for an accelerating operation of the motorcycle displayed on the display.

7. The riding simulation system according to claim 1, wherein the steering handle mechanism is formed in a cylindrical shape and includes a throttle grip for an accelerating operation of the motorcycle displayed on the display.

8. The riding simulation system according to claim 1, wherein said display is a display for a personal computer.

9. The riding simulation system according to claim 1, said control unit further including
   a casing being formed in a substantially box shape,
   a circuit substrate being disposed in an interior of the casing, and
   a plurality of connection cables being connected to the circuit substrate through connectors.

10. The riding simulation system according to claim 1, wherein a casing of the control unit is disposed between a first main frame and a second main frame, and said casing is provided with a plurality of flange portions projecting to a side of the casing adjacent the first main frame and is provided with a plurality of flange portions projecting to a side of the casing adjacent second main frame.

11. The riding simulation apparatus according to claim 1, wherein a casing of the control unit is centrally disposed between the left main frame and the right main frame such that a space is provided between left and right sides of the casing and the corresponding linear portion of the left and right main frames.

12. A riding simulation system for providing an operator with a simulated experience of a running condition of a motorcycle, said system comprising:
   a display for displaying scenery viewable to the operator as a video image on the display, wherein said video image is simulated based on an operating condition designated by the operator through the operation of an operating condition simulating mechanism;
   a steering handle mechanism including a steering stem, and an elongate steering handle capable of being gripped by the operator;
   a body for rotatably securing said steering handle mechanism, the body comprising:
      a pair of left and right main frames, each of which includes
         a downwardly sloping linear portion,
         a horizontal linear portion extending from a lower end of the downwardly sloping linear portion in a direction away from the operator of the simulation system, and
         a stopper mechanism having a fixing bolt provided at a forward end of the horizontal linear portion, and
      a pair of left and right sub-frames, each of which is connected to a roughly central part of the corresponding downwardly sloping linear portion in a position that is directly above the corresponding horizontal linear portion and extending in a direction that is away from the operator of the apparatus and that is substantially parallel to the corresponding horizontal linear portion; and
   a control unit for said system being mounted in a position directly between the downwardly sloping linear portions and having lateral sides having lengths which are parallel to the downwardly sloping linear portions, the position of the control unit being rearward with respect to each of the sub-frames, and rearward with respect to the fixing bolts at the forward ends of the horizontal linear portions, wherein said riding simulation apparatus is adapted to be mounted on a standard household table, and since the control unit is mounted such that the lengths of the lateral sides of the control unit are parallel to the downwardly sloping linear portions, the control unit is mounted completely away from an upper side of the standard household table.

13. The riding simulation system according to claim 1, wherein a forward end of the centrally located main frame disposed farthest away from the operator is connected to a cross frame bridging between forward ends of the sub-frames, wherein a forward-most face of the control unit, which is located rearwardly and separately of the cross frame, faces a rear side of the cross frame.

14. The riding simulation system according to claim 12, wherein a forward end of the centrally located main frame disposed farthest away from the operator is connected to a cross frame bridging between forward ends of the sub-frames, wherein a forward-most face of the control unit, which is located rearwardly and separately of the cross frame, faces a rear side of the cross frame.

15. The riding simulation system according to claim 1, wherein when the riding simulation system is viewed in a side elevation view, the left and right downwardly sloping linear portions can be seen to overlap the lengths of the left and right lateral sides of the control unit.

16. The riding simulation system according to claim 12, wherein when the riding simulation system is viewed in a side elevation view, the left and right downwardly sloping linear portions can be seen to overlap the lengths of the left and right lateral sides of the control unit.

* * * * *